United States Patent
Tabata (10) Patent No.: US 8,602,655 B2
(45) Date of Patent: Dec. 10, 2013

(54) BEARING UNIT FOR TURBOCHARGER

(75) Inventor: Masakazu Tabata, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 62 days.

(21) Appl. No.: 13/259,242

(22) PCT Filed: Mar. 27, 2009

(86) PCT No.: PCT/JP2009/056305
§ 371 (c)(1),
(2), (4) Date: Oct. 17, 2011

(87) PCT Pub. No.: WO2010/109653
PCT Pub. Date: Sep. 30, 2010

(65) Prior Publication Data
US 2012/0039555 A1   Feb. 16, 2012

(51) Int. Cl.
*F16C 19/08*   (2006.01)
*F16C 33/30*   (2006.01)

(52) U.S. Cl.
USPC ............................. 384/490; 384/504; 384/513

(58) Field of Classification Search
USPC ............ 384/97, 99, 490, 504, 513, 515, 596, 384/609
See application file for complete search history.

(56) References Cited

U.S. PATENT DOCUMENTS

| | | | |
|---|---|---|---|
| 2,973,136 A * | 2/1961 | Greenwald | 417/407 |
| 4,652,219 A * | 3/1987 | McEachern et al. | 417/407 |
| 4,677,871 A * | 7/1987 | Taniyama et al. | 74/467 |
| 4,721,441 A * | 1/1988 | Miyashita et al. | 417/407 |
| 4,983,050 A * | 1/1991 | Aida | 384/99 |
| 4,997,290 A * | 3/1991 | Aida | 384/99 |
| 5,145,334 A * | 9/1992 | Gutknecht | 417/407 |
| 5,174,839 A * | 12/1992 | Schultz et al. | 152/415 |

(Continued)

FOREIGN PATENT DOCUMENTS

| | | |
|---|---|---|
| CN | 1382897 A | 12/2002 |
| CN | 1890475 A | 1/2007 |

(Continued)

OTHER PUBLICATIONS

International Search Report of PCT/JP2009/056305 issued Jul. 7, 2009.

*Primary Examiner* — Marcus Charles
(74) *Attorney, Agent, or Firm* — Kenyon & Kenyon LLP (57) ABSTRACT

Disclosed is a bearing unit for a turbocharger including a rotary shaft at one end of which and the other end of which a turbine wheel and an impeller respectively are provided, and of which on the turbine-wheel side is formed a large-diameter turbine-side step, the rotary shaft being supported between the turbine-side step and the impeller such that the rotary shaft is freely rotatable, the bearing unit comprises a turbine-side ball bearing in which balls are located on the turbine-wheel side, an impeller-side ball bearing positioned such that balls are located on the impeller side, and a positioning step configured to restrict movement of the inner race of the turbine-side ball bearing toward the turbine wheel and to position the turbine-side ball bearing such that the end of the inner race is separated from the turbine side step.

15 Claims, 6 Drawing Sheets

(56) References Cited

U.S. PATENT DOCUMENTS

| | | | |
|---|---|---|---|
| 5,890,881 A * | 4/1999 | Adeff | 417/407 |
| 5,997,103 A * | 12/1999 | Wagner | 29/898.07 |
| 6,149,244 A * | 11/2000 | Wagner | 301/105.1 |
| 6,478,553 B1 * | 11/2002 | Panos et al. | 417/407 |
| 6,877,901 B2 * | 4/2005 | Wollenweber | 384/535 |
| 6,935,788 B2 * | 8/2005 | Stanczak | 384/551 |
| 7,371,011 B2 * | 5/2008 | McKeirnan, Jr. | 384/517 |
| 7,517,154 B2 * | 4/2009 | McKeirnan, Jr. | 384/519 |
| 7,832,938 B2 * | 11/2010 | McKeirnan, Jr. | 417/407 |
| 2004/0200215 A1 * | 10/2004 | Woollenweber et al. | 60/407 |
| 2005/0286819 A1 | 12/2005 | Mavrosakis | |
| 2007/0036477 A1 * | 2/2007 | McKeirnan, Jr. | 384/517 |
| 2007/0227516 A1 | 10/2007 | Middlebrook et al. | |
| 2007/0280824 A1 | 12/2007 | Ward | |
| 2008/0019629 A1 * | 1/2008 | McKeirnan | 384/493 |

FOREIGN PATENT DOCUMENTS

| | | | |
|---|---|---|---|
| DE | 4334339 A1 * | 4/1995 | F02C 7/06 |
| EP | 0472170 A2 | 2/1992 | |
| JP | 63-009430 U | 1/1988 | |
| JP | 05-125952 A | 5/1993 | |
| JP | 06-101494 A | 4/1994 | |
| JP | 2005-172099 A | 6/2005 | |
| JP | 2007-071356 A | 3/2007 | |
| JP | 2007-192303 A | 8/2007 | |
| JP | 2008-504484 A | 2/2008 | |
| JP | 2008-082298 A | 4/2008 | |
| JP | 2008-088855 A | 4/2008 | |
| JP | 2008-298284 A | 12/2008 | |
| WO | 98/23886 A1 | 6/1998 | |

* cited by examiner

BEARING UNIT FOR TURBOCHARGER

CROSS REFERENCE TO RELATED APPLICATIONS

This is a 371 national phase application of PCT/JP2009/056305 filed 27 Mar. 2009, the content of which is incorporated herein by reference.

TECHNICAL FIELD

The present invention relates to bearing units for a turbocharger supporting the rotary shaft of the turbocharger by means of a ball bearing such that the rotary shaft is able to rotate.

BACKGROUND ART

Known bearing units for a turbocharger include two ball bearings composed by providing a pair of outer races on both ends of a common inner race, and attaching a spring for applying preload to only the outside of one of the outer races (Patent Literature 1). As other prior art literature related to the present invention, Patent Literatures 2 to 4 have been proposed.

CITATION LIST

Patent Literature 1: JP-A-2005-172099
Patent Literature 2: JP-A-2008-88855
Patent Literature 3: JP-A-2008-298284
Patent Literature 4: JP-A-2007-71356

BRIEF SUMMARY OF THE INVENTION

Technical Problem

A bearing unit in the Patent Literature 1 is configured as described below. While the bearing unit is being fitted to a turbocharger, the turbine-side end of an inner race is brought into contact with a step formed on the rotary shaft. Additionally, while the impeller-side end is kept in contact with a spacer provided around the periphery of the rotary shaft, the spacer is compressed, thereby positioning each ball bearing. Therefore, while the bearing unit is being fitted to the turbocharger, the inner race is compressed as it is kept in contact with the step of the rotary shaft. As a result, the rotary shaft may curve on the turbine side due to the processing accuracy, such as angularity, of the step and inner race. Consequently, a curve that has been caused on the turbine side of rotary shaft may result in unbalance of the rotary shaft. This unbalance has to be corrected.

Accordingly, it is an object of the present invention to provide bearing units for a turbocharger, which prevent turbine-side curving of a rotary shaft while the bearing units are being fitted to the turbocharger.

Solution to the Problem

A first mode of a bearing unit for a turbocharger according to the present invention supports a rotary shaft having one end provided with a turbine wheel, the other end provided with an impeller, and a large-diameter turbine-side step formed on the turbine wheel side, the rotary shaft being supported between the turbine-side step and the impeller such that the rotary shaft is freely rotatable. This bearing unit comprises: a turbine-side ball bearing having an inner race adjacent to the turbine-side step and in which balls are located on the turbine-wheel side; an impeller-side ball bearing positioned such that balls are located on the impeller side; and a positioning portion configured to restrict movement of the inner race of the turbine-side ball bearing toward the turbine wheel side and to position the turbine-side ball bearing such that the turbine wheel side end of the inner race is separated from the turbine side step. A second mode of a bearing unit for a turbocharger supports a rotary shaft having one end provided with a turbine wheel, the other end provided with an impeller, and a large-diameter turbine-side step formed on the turbine wheel side, the rotary shaft being supported between the turbine-side step and the impeller such that the rotary shaft is freely rotatable. This bearing unit comprises: a turbine-side ball bearing in which balls are located on the turbine-wheel side; an impeller-side ball bearing positioned such that balls are located on the impeller side; and a positioning portion configured to restrict movement of an inner race of the turbine-side ball bearing toward the turbine wheel side and to position the turbine-side ball bearing such that the turbine wheel side end of the inner race is separated from the turbine side step. The inner race of the turbine-side ball bearing and the turbine-side step do not come into contact with each other directly. A third mode of a bearing unit for a turbocharger supports a rotary shaft having one end provided with a turbine wheel, the other end provided with an impeller, and a large-diameter turbine-side step formed on the turbine wheel side, the rotary shaft being supported between the turbine-side step and the impeller such that the rotary shaft is freely rotatable. This bearing unit comprises: a turbine-side ball bearing in which balls are located on the turbine-wheel side; an impeller-side ball bearing positioned such that balls are located on the impeller side; and a positioning portion configured to restrict movement of an inner race of the turbine-side ball bearing toward the turbine wheel side and to position the turbine-side ball bearing such that the turbine wheel side end of the inner race is separated from the turbine side step. The inner race of the turbine-side ball bearing does not come into contact with the turbine-side step.

In these bearing units, the turbine-side ball bearing is positioned by the positioning portion such that the turbine-wheel side end of the inner race is separated from the turbine-side step. Accordingly, while the bearing unit is being fitted to the turbocharger, contact of the inner race of the turbine-side ball bearing with the turbine-side step can be avoided. Accordingly, regardless of the processing accuracy of the inner race and turbine-side step, turbine-side curving of the rotation shaft can be prevented. This eliminates the need to correct an imbalance of the rotary shaft otherwise resulting from turbine-side curving.

In one aspect of the bearing system according to the present invention, the inner race of the turbine-side ball bearing extends to a point close to the impeller, and movement of the impeller-side end of this inner race may be restricted by the positioning portion. Generally, the imbalance of the rotary shaft is corrected by trimming predetermined parts of rotating elements, such as the impeller and rotary shaft. After correction of such an imbalance, fitting of the bearing system to the turbocharger is completed. According to this aspect, the turbine-side ball bearing is positioned close to the impeller; therefore, curving of the rotary shaft, which may be caused while the bearing unit is being fitted to the turbocharger, concentrates on the impeller side. Accordingly, performing a process only for the impeller side makes it possible to correct an imbalance of the rotary shaft that may result from curving of the rotary shaft due to positioning of the impeller-side ball bearing or curving of the rotary shaft due to positioning of the turbine-side ball bearing. Since a process for correcting such an imbalance does not have to be performed for the turbine side, the time and effort required for a balance correction process can be eliminated.

In this aspect, while movement of the inner race of the impeller-side ball bearing toward the turbine wheel side is restricted, the inner race of the impeller-side ball bearing may be fitted around an outer circumference of the inner race of the turbine-side ball bearing, and the positioning portion may be located closer to the impeller than to the center of any of the balls of the impeller-side ball bearing. In this case, the turbine-side ball bearing can be positioned closer to the impeller than to the center of any of the balls of the impeller-side ball bearing. Accordingly, any curving of the rotary shaft resulting from the positioning of the turbine-side ball bearing can be further concentrated on the impeller side.

In another aspect of the bearing unit of the present invention, the impeller-side ball bearing may be positioned integrally with the turbine-side ball bearing by use of the positioning portion. According to this aspect, the impeller-side ball bearing can be positioned using the positioning portion provided to position the turbine-side ball bearing. Accordingly, compared to the case where the ball bearings are positioned by separate positioning portions, the number of components and the man-hours required for processing can be decreased and a dimensional increase in the direction of the axis can be prevented, resulting in a more efficient use of space.

In this aspect, the bearing system may further include a spacer interposed between the respective inner races of the impeller-side ball bearing and turbine-side ball bearing and having its width about the direction of an axis of the rotary shaft. In this case, correcting the width of the spacer interposed between the inner races in the axial direction can absorb dimension errors of the inner races of the impeller-side ball bearing and turbine-side ball bearing in the axial direction. Accordingly, the processing accuracy of an inner race of stricter level due to the sharing of the positioning step can be relaxed by use of the spacer. Thus processing of the inner races is facilitated.

In the bearing unit according to the present invention, the configuration of the positioning portion may be realized in various aspects. For example, the rotary shaft may be provided with a restricting member, such as a pin, for use as a positioning portion, and thus movement of each inner race may be restricted. Alternatively, movement of each inner race may be restricted by tapering the periphery of the rotary shaft around which the inner race is provided such that the outer diameter of the periphery gradually increases toward the turbine wheel. Additionally, as an aspect different from the foregoing aspects, the inner race of the turbine-side ball bearing may have a projecting portion which juts out toward the center of the rotation shaft, and the positioning portion may be provided as a positioning step formed on the rotary shaft so as to increase in diameter toward the turbine wheel side and be able to come into contact with the projecting portion. In this case, it is unnecessary to provide an additional member in order to realize the positioning portion, and processing is also easier.

DESCRIPTION OF EMBODIMENTS

First Embodiment

Figure 1:
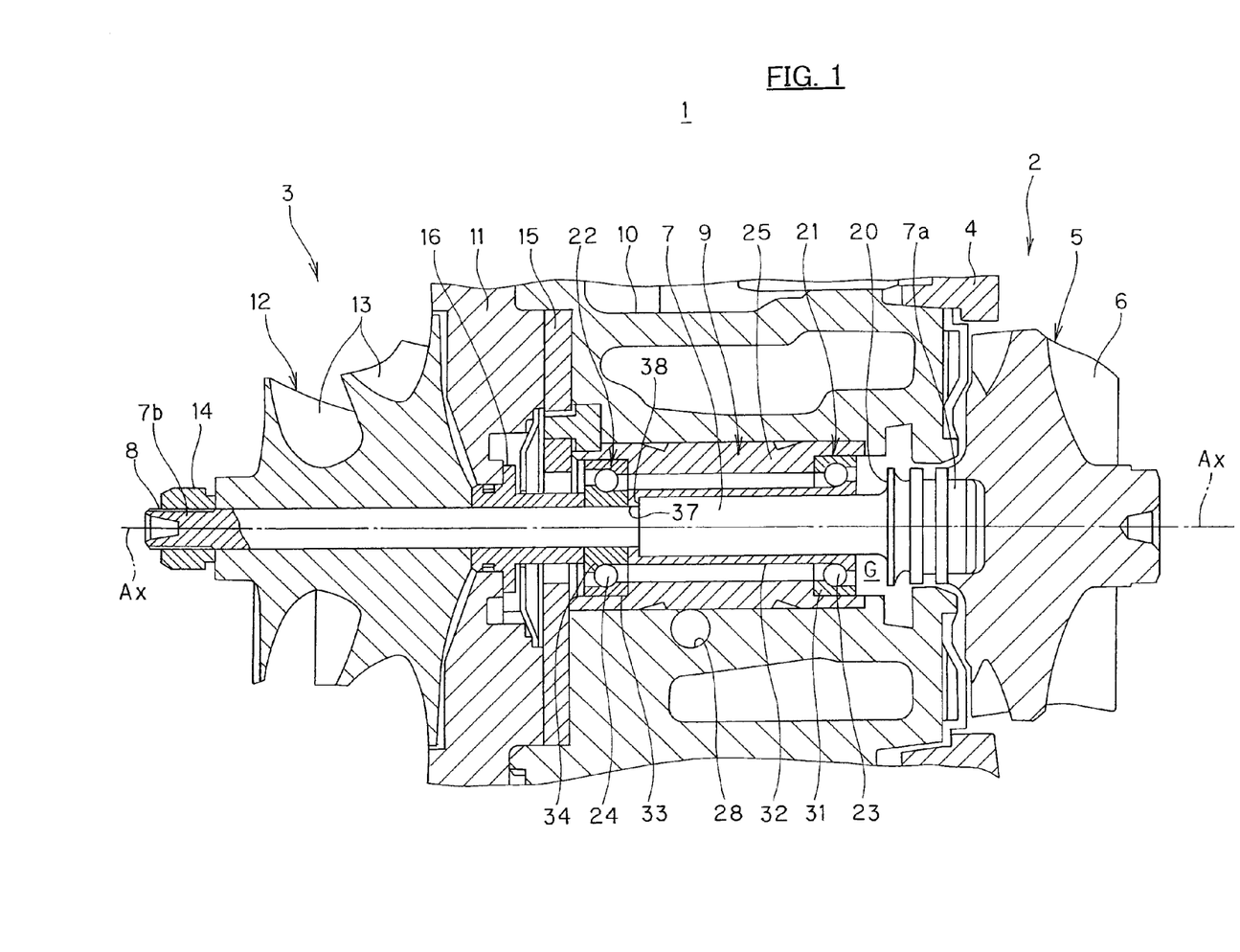
FIG. 1 is a diagram showing the main part of a turbocharger incorporating a bearing unit according to the first embodiment of the present invention.

FIG. 1 shows the main part of a turbocharger incorporating a bearing unit according to the first embodiment of the present invention. The turbocharger 1 is used by being attached to an internal combustion engine mounted in a vehicle such as an automobile. The turbocharger 1 includes a turbine 2, to which exhaust from the engine is drawn, and a compressor 3, which is driven by the turbine 2 and compresses air to be taken into the engine. The turbine 2 has a turbine wheel 5 accommodated in a turbine housing 4. The turbine wheel 5 has plural turbine blades 6 arranged in a circumferential direction around the turbine wheel 5. Using a joining means such as welding, the turbine wheel 5 is joined to the right end 7a of a rotary shaft 7 supported so as to freely rotate around an axis Ax. A male screw 8 is formed on the left end 7b of the rotary shaft 7. The bearing unit 9 supporting the rotary shaft 7 is attached to a bearing housing 10.

The compressor 3 includes an impeller 12 accommodated in a compressor housing 11. The impeller 12 has plural compressor vanes 13 arranged in a circumferential direction around the impeller 12. The rotary shaft 7 is inserted into the impeller 12 while a rotation stopper, not shown, is provided. Screwed on the left end 7b of the rotary shaft 7 projecting from the impellor 12 is an impeller nut 14 engaging the male screw 8. Thus, the impeller 12 is fastened by the impeller nut 14 together with the bearing unit 9, and fixed on the rotary shaft 7. In order to restrict movement of the bearing unit 9 in the direction of the axis Ax, a retainer 15 and a collar 16 are interposed between the compressor housing 11 and the bearing housing 10.

Figure 2:
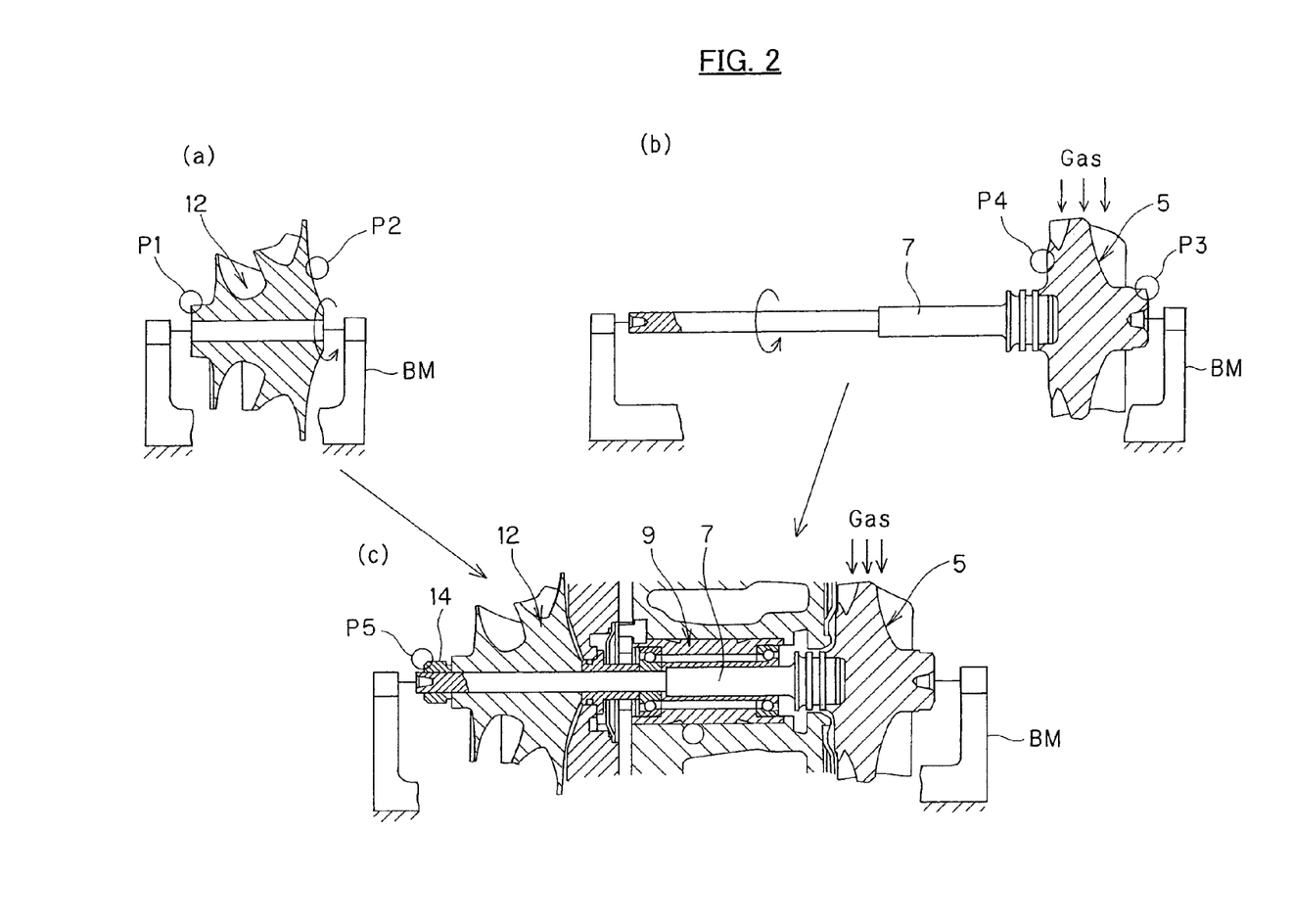
FIG. 2 is a diagram schematically illustrating the outline of a balance correction process performed during the assembly of the turbocharger shown in FIG. 1.

FIG. 2 is a diagram schematically illustrating the outline of a balance correction process performed during the assembly of the turbocharger 1 shown in FIG. 1. In order to suppress occurrence of vibration and noise during high-speed rotation, a balance correction process is performed for the turbocharger 1, thereby improving dynamic balance. The balance correction process is performed in plural steps during the assembly of the turbocharger 1. First, as shown in FIG. 2(a), the impeller 12 is subjected to the balance correction process before assembly. The impeller 12 is installed on a given balancing machine BM. While dynamic balance is being measured, parts P1 and P2 to be processed, which are set on the tip corners and rear of the impeller 12, are gradually trimmed. This process is repeated so that the dynamic balance of the impeller 12 falls within a permissible range.

On the other hand, subsequent to or parallel to this process shown in FIG. 2(a), the rotary shaft 7 with the turbine wheel 5 connected thereto is subjected to a balance correction process, as shown in FIG. 2(b). The rotary shaft 7 in this state is attached to the balancing machine BM. Then, in the same manner as that in FIG. 2(a), while dynamic balance is being measured, parts P3 and P4 to be processed, which are set on the tip corners and rear of the turbine wheel 5, are gradually trimmed until the dynamic balance of the rotary shaft 7 falls within a permissible range. Incidentally, blowing a specific inert gas Gas onto the turbine wheel 5 enables the balancing machine BM to measure dynamic balance while rotating the rotary shaft 7.

After the balance correction processes are performed in the steps shown in FIGS. 2(*a*) and (*b*), the impeller 12 is fastened to the rotary shaft 7 by the impeller nut 14 together with the bearing unit 9 as described above, thereby fitting the components together. Thereafter, a balance correction process is performed as shown in FIG. 2(*c*). The reason the balance correction process is performed after the components have been fitted together is that while the impeller 12 is being fitted, the impeller nut 14 is screwed tightly on the rotary shaft 7 while movement of the impeller 12 toward the turbine wheel 5 is restricted by the collar 16 and bearing unit 9. As a result, the rotary shaft 7 is affected by the processing accuracy of each of the components, resulting in its curving in the order of several 10*s* of micrometers. Any unbalance caused by such curving is corrected by gradually trimming a part P5 to be processed, which is set on the cephalic portion of the impeller nut 14, while measuring dynamic balance on the balancing machine BM. This will be discussed in detail below. However, while the impeller 12 is being fitted, the characteristic configuration of the bearing unit 9 suppresses curving of the rotary shaft 7 on the turbine wheel 5 side, and any unbalance resulting from the curving of the rotary shaft 7 concentrates on the impeller 12 side. Therefore, performing the correction process for only the impeller 12 side without performing it for the turbine wheel 5 side enables the entire dynamic balance to fall within a permissible range.

Figure 3:
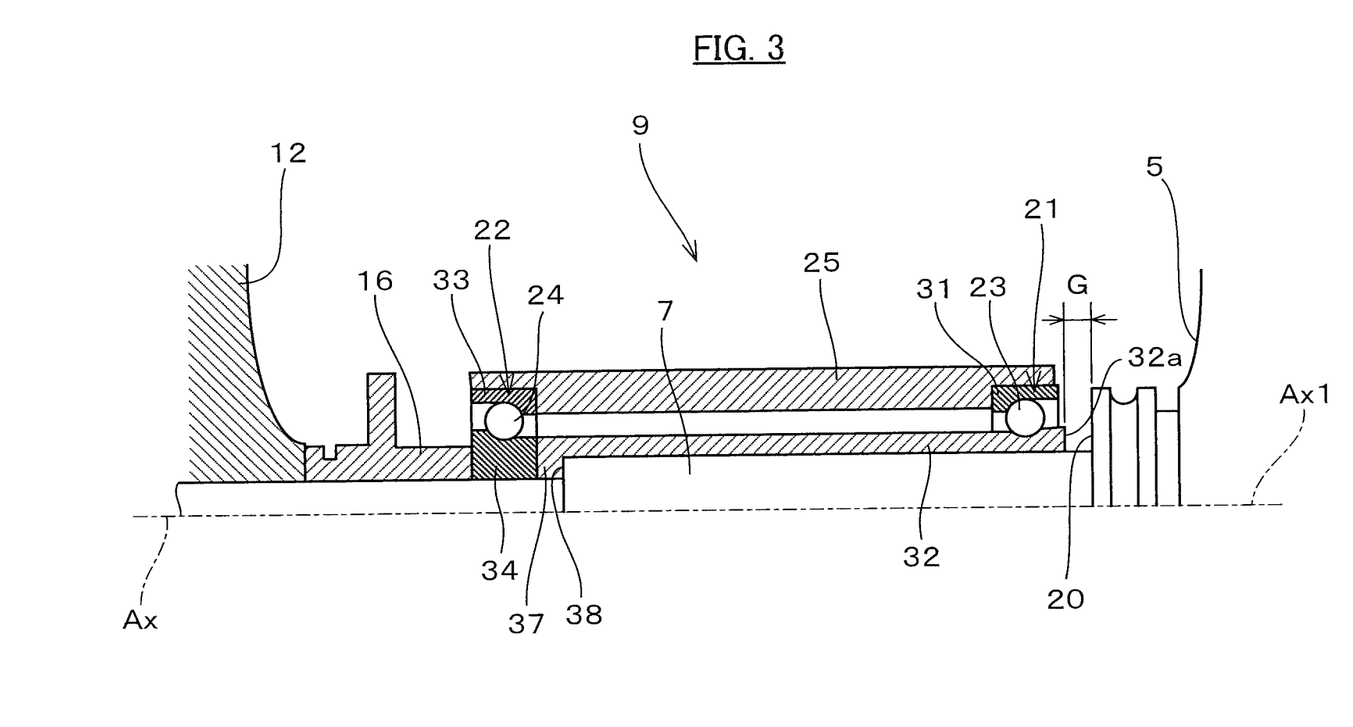
FIG. 3 is an enlarged diagram of the bearing unit shown in FIG. 1 and the surroundings thereof.

FIG. 3 is an enlarged diagram of the bearing unit 9 shown in FIG. 1 and the surroundings thereof. As shown in FIG. 3, the bearing unit 9 supports the rotary shaft 7 between the turbine wheel 5 and impeller 12, specifically, between the impeller 12 and a large-diameter turbine-side step 20 formed on the rotary shaft 7, such that the rotary shaft 7 is freely rotatable. The bearing unit 9 includes a turbine-side ball bearing 21 in which balls 23 are located on the turbine wheel 5 side; an impeller-side ball bearing 22 in which balls 24 are located on the impeller 12 side and a holder 25 by which these ball bearings 21 and 22 are held by the bearing housing 10. Each of the ball bearings 21 and 22 is configured as an angular contact type. Oil is guided to the holder 25 through an oil passage 28 (FIG. 1) formed in the bearing housing 10, and the oil is supplied to each of the ball bearings 21 and 22 through an oil hole, not shown. The turbine-side ball bearing 21 includes an outer race 31 having an outer circumference fitted in the holder 25 and an inner race 32 attached to the rotary shaft 7 and disposed on the inner circumferential side of the outer race 31 so as to be concentric with the outer race 31. The outer and inner races 31 and 32 hold the balls 23 such that the balls 23 are able to roll. The impeller side ball bearings 22 includes an outer race 33 having an outer circumference fitted in the holder 25 and an inner race 34 attached to the rotary shaft 7 and disposed on the inner circumferential side of the outer race 33 so as to be concentric with the outer race 33. The outer and inner races 33 and 34 hold the balls 24 such that the balls 24 are able to roll.

The inner race 32 of the turbine-side ball bearing 21 extends in one direction toward the impeller 12 side from the position where the balls 23 are held. The end of the extending inner race 32 has an inward flange 37, formed as a projecting portion, which juts out toward the center of the rotary shaft 7. This inward flange 37 is disposed in contact with a positioning step 38 formed on the rotary shaft 7. The positioning step 38 is formed on the rotary shaft 7 so as to increase in diameter toward the turbine wheel 5 side. This positioning step 38 restricts movement of the inner race 32 toward the turbine wheel 5 side, and hence positions the turbine-side ball bearing 21. The location where the positioning step 38 is formed and the dimensions of the inner race 32 about the direction of the axis Ax are set such that when movement of the inner race 32 is restricted by the positioning step 38, the end 32*a* of the turbine wheel 5 side is separated from the turbine-side step 20. In this embodiment, a gap G is defined between the end 32*a* and the turbine-side step 20 with no members interposed between them.

While the impeller 12 is being fitted, the collar 16 presses the inner race 34. Consequently, the inner race 34 of the impeller-side ball bearing 34 comes into contact with the inner race 32 of the turbine-side ball bearing 21 positioned by the positioning step 38. Thus, the impeller-side ball bearing 22 is positioned such that the movement of its inner race 34 toward the turbine wheel 5 side is restricted. In other words, using the positioning step 38, the impeller-side ball bearing 22 is positioned integrally with the turbine-side ball bearing 21. Accordingly, compared to the case where ball bearings 21 and 22 are positioned by separate positioning portions, the number of components and of processing steps can be reduced. Additionally, since a dimensional increase in the direction of the axis Ax can be prevented, space is used more efficiently.

In the inner race 32 of the turbine-side ball bearing 21, the end 32*a* on the turbine wheel 5 side does not come into contact with the turbine-side step 20 while the impeller 12 is being fitted. Accordingly, curving of the rotary shaft 7 on the turbine wheel 5 side is prevented. That is, curving of the rotary shaft 7, which is caused during the fitting of the impeller 12, concentrates on the impeller 12 side. Therefore, as shown in FIG. 2(*c*), performing the balance correction process only for the part P5 to be processed, which is set on the impeller side 12, makes it possible to correct any unbalance resulting from curving of the rotary shaft 7 with fitting the bearing unit 9, that is, with positioning the ball bearings 21 and 22.

Second Embodiment

Next, a bearing unit according to the second embodiment of the present invention will be described with reference to FIG. 4. In the description below, members in the drawing that are common to the first embodiment are denoted with reference signs identical to those in the drawings used for the first embodiment, and duplicate descriptions are omitted. Additionally, as in the first embodiment, a bearing unit according to the second embodiment can also be incorporated in the turbocharger 1, and the state in which the bearing unit is incorporated in the turbocharger 1 is identical to that in the first embodiment. Therefore, a drawing corresponding to FIG. 1 is omitted.

Figure 4:
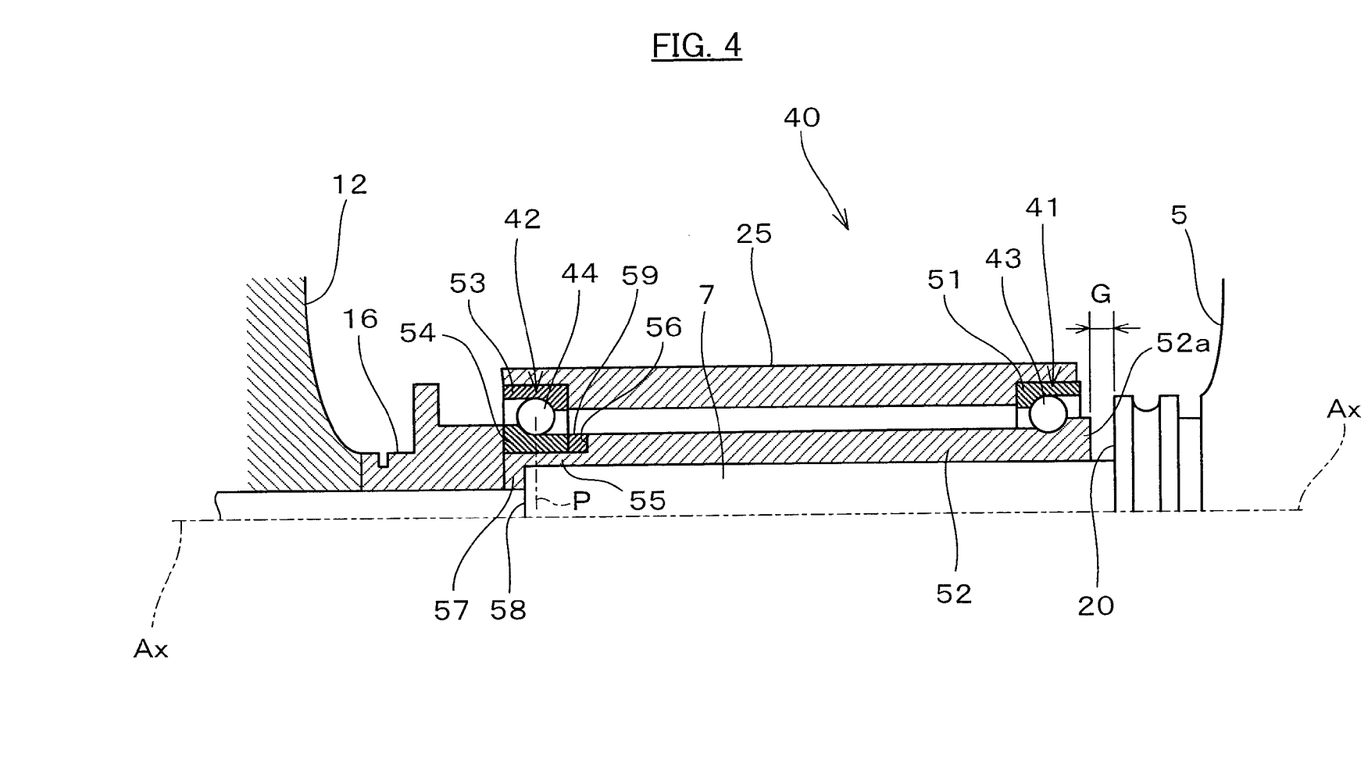
FIG. 4 is an enlarged diagram of the bearing unit according to the second embodiment and its surroundings.

FIG. 4 is an enlarged diagram of the bearing unit according to the second embodiment and its surroundings. As shown in FIG. 4, the bearing unit 40 supports a rotary shaft 7 between a turbine-side step 20 and an impeller 12 such that the rotary shaft 7 is freely rotatable. The bearing unit 40 includes a turbine-side ball bearing 41 in which balls 43 are located on the turbine wheel 5 side, and an impeller-side ball bearing 42 in which the balls 44 are located on the impeller 12 side. The ball bearings 41 and 42 are held by a holder 25. Each of the ball bearings 41 and 42 is configured as an angular contact type.

The turbine-side ball bearing 41 includes an outer race 51, having an outer circumference fitted in the holder 25, and an inner race 52 provided on a rotary shaft 7 and disposed on the inner circumferential side of the outer race 51 so as to be concentric with the outer race 51. The outer and inner races 51 and 52 hold the balls 43 such that the balls 43 are able to roll. The impeller-side ball bearing 42 includes an outer race 53 having an outer circumference fitted in the holder 25, and an inner race 54 disposed on the inner circumferential side of the outer race 53 so as to be concentric with the outer race 53. The outer and inner races 53 and 54 hold the balls 44 such that the balls 44 are able to roll. The inner race 52 of the turbine-side ball bearing 41 extends in one direction toward the impeller 12 side from the position where the balls 43 are held. Formed on the impeller 12 side of the inner race 52 is a small-diameter portion 55 around which the inner race 54 of the impeller-side ball bearing 42 is provided. A step 56 is formed on the root of the small-diameter portion 55. The leading end of the small-diameter portion 55 has an inward flange 57, formed as a projecting portion, which juts out toward the center of the rotary shaft 7 and comes into contact with a positioning step 58 formed on the rotary shaft 7. The positioning step 58 is formed on the rotary shaft 7 so as to increase in diameter toward the turbine wheel 5 side. The location where the positioning step 58 is formed is set closer to the impeller 12 than to the position P of the center of each ball 44 of the impeller-side ball bearing 42.

Movement of the inner race 52 toward the turbine wheel 5 side is restricted by the positioning step 58. Thereby the turbine-side ball bearing 51 is positioned. The location where the positioning step 58 is formed and the dimension of the inner race 52 about the direction of the axis Ax are set such that when movement of the inner race 52 is restricted by the positioning step 58, the end 52a on the turbine wheel 5 side is separated from the turbine-side step 20. As in the first embodiment, in this embodiment also, a gap G is defined between the end 52a and the turbine-side step 20 with no members interposed between them.

The inner race 54 of the impeller-side ball bearing 42 is provided around the outer circumference of the small-diameter portion 55 formed on the inner race 52 of the turbine-side ball bearing 41. When the impeller 12 is fitted, a collar 16 presses the inner race 54. Thereby the inner race 54 comes into contact with a spacer 59 that has been brought into contact with the step 56. Consequently, the impeller-side bearing 42 is positioned by virtue of the movement of the inner race 54 toward the turbine wheel 5 side being restricted.

According to the second embodiment, the end 52a of the inner race 52 of the turbine-side ball bearing 41 is prevented from coming into contact with the turbine-side step 20 while the impeller 12 is being fitted. Thus, the same effect is yielded as in the first embodiment. Furthermore, in the second embodiment, the location where the positioning step 58 is formed is set closer to the impeller 12 than to the position P of the center of each ball 44 of the impeller-side ball bearing 42. Therefore, curving of the rotary shaft 7 resulting from positioning the turbine-side ball bearing 42 can be further concentrated on the impeller 12 side. This facilitates the balance correction process after the fitting of the impeller 12.

Third Embodiment

Next, a ball bearing unit according to the third embodiment of the present invention will be described with reference to FIG. 5. In the description below, members in the drawing that are common to the first embodiment are denoted with reference signs identical to those in the drawings used for the first embodiment, and duplicate descriptions are omitted. Additionally, as in the first embodiment, the bearing unit according to the third embodiment can also be incorporated in the turbocharger 1, and the state in which the bearing unit is incorporated in the turbocharger 1 is identical to that in the first embodiment. Therefore, a drawing corresponding to FIG. 1 is omitted.

Figure 5:
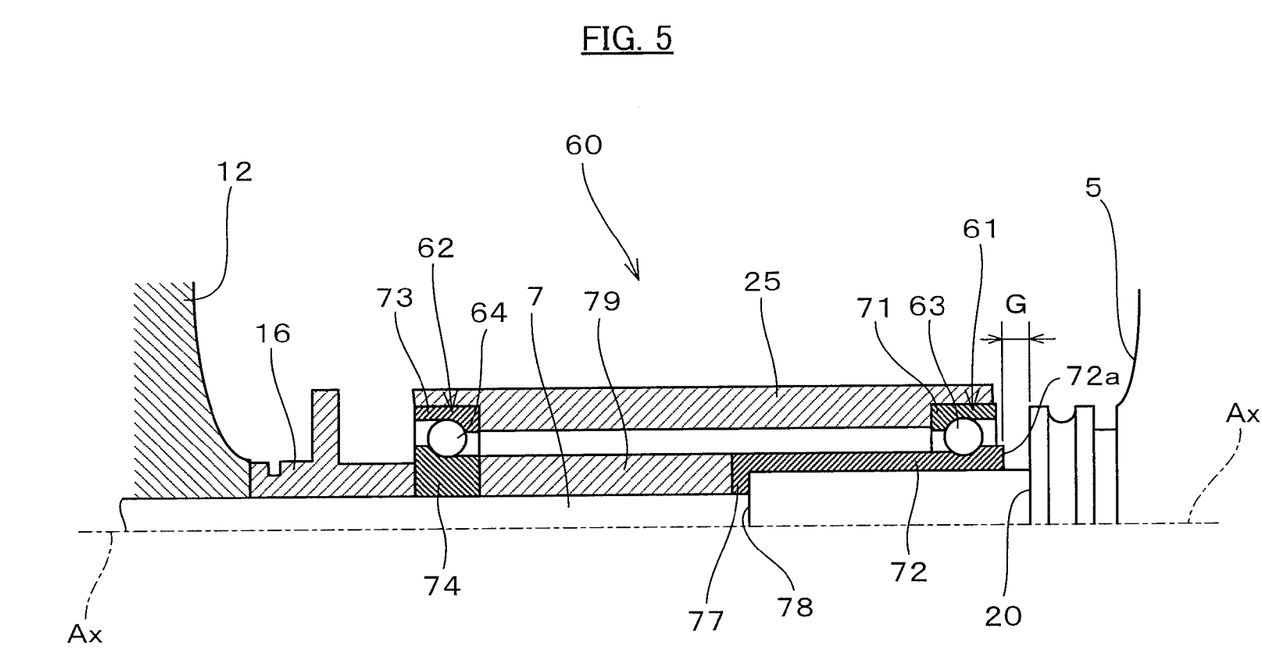
FIG. 5 is an enlarged diagram of the bearing unit according to the third embodiment and its surroundings.

FIG. 5 is an enlarged diagram of the bearing unit according to the third embodiment and its surroundings. As shown in FIG. 5, the bearing unit 60 supports a rotary shaft 7 between a turbine-side step 20 and an impeller 12 such that the rotary shaft 7 is freely rotatable. The bearing unit 60 includes a turbine-side ball bearing 61 in which balls 63 are located on the turbine wheel 5 side, and an impeller-side ball bearing 62 in which the balls 64 are located on the impeller 12 side. The ball bearings 61 and 62 are held by a holder 25. Each of the ball bearings 61 and 62 is configured as an angular contact type. The turbine-side ball bearing 61 includes an outer race 71 having the outer circumference fitted in the holder 25, and an inner race 72 provided on the rotary shaft 7 and disposed on the inner circumferential side of the outer race 71 so as to be concentric with the outer race 71. The outer and inner races 71 and 72 hold the balls 63 such that the balls 63 are able to roll. The impeller side ball bearings 62 includes an outer race 73 having the outer circumference fitted in the holder 25, and an inner race 74 provided on the rotary shaft 7 and disposed on the inner circumferential side of the outer race 73 so as to be concentric with the outer race 53. The outer race 73 and inner race 74 hold the balls 64 such that the balls 64 are able to roll.

The inner race 72 of the turbine-side ball bearing 61 extends in one direction toward the impeller 12 side from the position where the balls 63 are held. The end of the extending inner race 72 has an inward flange 77, formed as a projecting portion, which juts out toward the center of the rotary shaft 7. The inward flange 77 is disposed in contact with a positioning step 78 formed on the rotary shaft 7. The third embodiment is different from the first embodiment in the following respects: the inner race 72 of the turbine-side ball bearing 61 is shorter than that in the first embodiment; the location where the positioning step 78 that comes into contact with the inward flange 77 is formed is set near the middle of the rotary shaft 7. The positioning step 78 is formed on the rotary shaft 7 so as to increase in diameter toward the turbine wheel 5 side. The contact of the inward flange 77 with the positioning step 78 restricts movement of the inner race 72 toward the turbine wheel 5 side. Thereby, the turbine-side ball bearing 61 is positioned. The location where the positioning step 78 is formed and the dimension of the inner race 72 about the direction of the axis Ax are set such that when movement of the inner race 72 is restricted by the positioning step 78, the end 72a on the turbine wheel 5 side is separated from the turbine-side step 20. As in the embodiments described above, in this embodiment also, a gap G is defined between the end 72a and the turbine-side step 20 with no members interposed between them.

A spacer 79 with its width in the direction of the axis Ax is interposed between the inner race 74 of the impeller-side ball bearing 62 and the inner race 72 of the turbine-side ball bearing 61. Accordingly, when a collar 16 is pressed against the inner race 74 of the impeller-side ball bearing 62 while the impeller 12 is being fitted, the inner race 74 comes into contact with the spacer 79 and the movement of the inner race 74 is restricted, thereby positioning the impeller-side ball bearing 62. Specifically, with the spacer 79 interposed between the inner races 72 and 74, the impeller-side ball bearing 62, together with the turbine-side ball bearing 61, is positioned by use of the positioning step 78.

According to the third embodiment, the end 72a of the inner race 72 of the turbine-side ball bearing 41 is prevented from coming into contact with the turbine-side step 20 when the impeller 12 is fitted. Accordingly, curving of the rotary shaft 7 on the turbine side is prevented regardless of the processing accuracy of the inner race 72 and the turbine-side step 20. This eliminates the need to correct any unbalance of the rotary shaft 7 resulting from turbine-side curving. Further, in the third embodiment, since the spacer 79 is interposed between the inner races 72 and 74, any dimension error of each of the inner races 72 and 74 in the direction of the axis Ax can be absorbed by correcting the width of the spacer 79. Accordingly, the processing accuracy of each of the inner races 72 and 74, the level of which is stricter due to the sharing of the positioning step 78, can be relaxed by use of the spacer 79. Therefore, processing of the inner races 72 and 74 is facilitated.

Fourth Embodiment

Next, a ball bearing unit according to the fourth embodiment of the present invention will be described with reference to FIG. 6. In the description below, members in the drawing that are common to the first embodiment are denoted with reference signs identical to those in the drawings used for the first embodiment, and duplicate descriptions are omitted. Additionally, as in the first embodiment, the bearing unit according to the fourth embodiment can also be incorporated in the turbocharger 1, and the state in which the bearing unit is incorporated in the turbocharger 1 is identical to that in the first embodiment. Therefore, a drawing corresponding to FIG. 1 is omitted.

Figure 6:
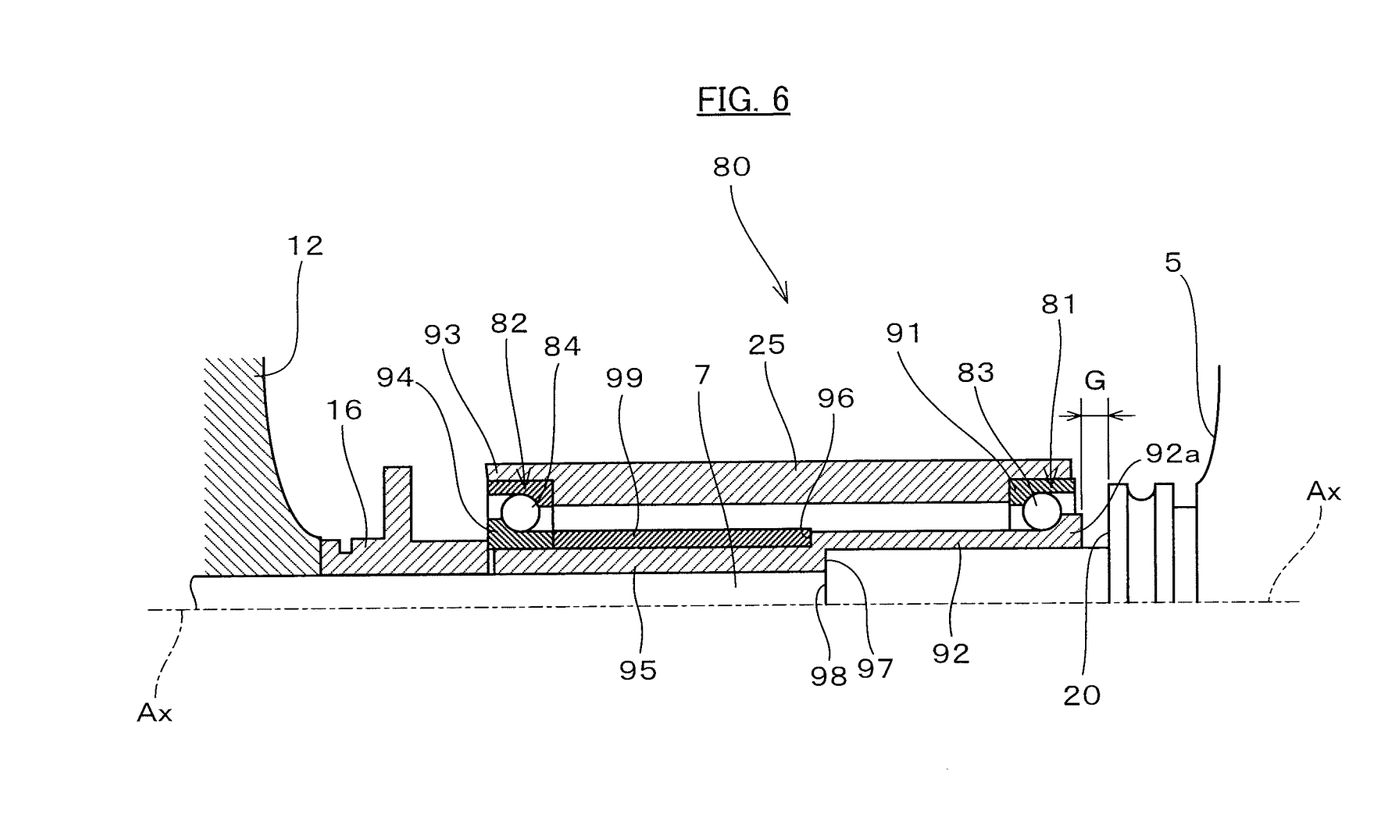
FIG. 6 is an enlarged diagram of the bearing unit according to the fourth embodiment and its surroundings.

FIG. 6 is an enlarged diagram of the bearing unit according to the fourth embodiment and its surroundings. As shown in FIG. 6, the bearing unit 80 supports a rotary shaft 7 between a turbine-side step 20 and an impeller 12 such that the rotary shaft 7 is freely rotatable. The bearing unit 80 includes a turbine-side ball bearing 81 in which balls 83 are located on the turbine wheel 5 side, and an impeller-side ball bearing 82 in which the balls 84 are located on the impeller 12 side. The ball bearings 81 and 82 are held by a holder 25. Each of the ball bearings 81 and 82 is configured as an angular contact type.

The turbine-side ball bearing 81 includes an outer race 91 having the outer circumference fitted in the holder 25, and an inner race 92 provided on the rotary shaft 7 and disposed on the inner circumferential side of the outer race 91 so as to be concentric with the outer race 91. The outer race 91 and inner race 92 hold the balls 83 such that the balls 83 are able to roll. The impeller-side ball bearings 82 include an outer race 93 having the outer circumference fitted in the holder 25, and an inner race 94 disposed on the inner circumferential side of the outer race 93 so as to be concentric with the outer race 93. The outer race 93 and inner race 94 hold the balls 84 such that the balls 84 are able to roll. The inner race 92 of the turbine-side ball bearing 81 extends in one direction toward the impeller 12 side from the position where the balls 83 are held. Formed in a range from the middle of the inner race 92 to its impeller-side end is a small-diameter portion 95 around which the inner race 94 of the impeller-side ball bearing 82 is provided. A step 96 is formed on the root of the small-diameter portion 95. The small diameter portion 95 has an inward step 97, formed as a projecting portion, which juts out toward the center of the rotary shaft 7 and comes into contact with a positioning step 98 formed on the rotary shaft 7. The positioning step 98 is formed on the rotary shaft 7 so as to increase in diameter toward the turbine wheel 5 side.

The contact of the inward step 97 with the positioning step 98 restricts movement of the inner race 92 toward the turbine wheel 5 side. Thereby, the turbine-side ball bearing 81 is positioned. The location where the positioning step 98 is formed and the dimension of the inner race 92 about the direction of the axis Ax are set such that when movement of the inner race 92 is restricted by the positioning step 98, the end 92a on the turbine wheel 5 side is separated from the turbine-side step 20. As in the first embodiment, in this embodiment also, a gap G is defined between the end 92a and the turbine-side step 20 with no members interposed between them.

The inner race 94 of the impeller-side ball bearing 82 is provided around the outer circumference of the small-diameter portion 95 formed on the inner race 92 of the turbine-side ball bearing 81. While the impeller 12 is being fitted, a collar 16 presses the inner race 94. Thereby the inner race 94 comes into contact with a spacer 99 that has been brought into contact with the step 96. Consequently, the impeller-side bearing 82 is positioned by virtue of movement of the inner race 94 toward the turbine wheel 5 side being restricted.

According to the fourth embodiment, the end 92a of the inner race 92 of the turbine-side ball bearing 81 is prevented from coming into contact with the turbine-side step 20 while the impeller 12 is being fitted. Accordingly, curving of the rotary shaft 7 on the turbine side is prevented regardless of the processing accuracy of the inner race 92 and the turbine-side step 20. This eliminates the need to correct any unbalance of the rotary shaft 7 resulting from turbine-side curving.

It is understood that the present invention is not limited to each embodiment described above but may be realized in various forms within the scope of the invention. In each embodiment, each ball bearing is positioned by a positioning step formed on the rotary shaft. However, each ball bearing may be positioned by providing the rotary shaft with a restricting member, such as a pin, instead of the step, for use as a positioning portion, and restricting movement of the inner race by use of the restricting member. Alternatively, each ball bearing may be positioned by tapering the periphery of the rotary shaft around which the inner race is provided, such that the outer diameter of the periphery gradually increases toward the turbine wheel side, thereby forming a positioning portion and restricting movement of the inner race by use of this positioning portion.

Each of the first and second embodiments has an advantage that the inner race of the turbine-side ball bearing is extended to a point close to the impeller, and movement of the end of the extended inner race is restricted by the positioning portion, thereby concentrating on the impeller side any unbalance caused by curving of the rotary shaft resulting from the positioning of the ball bearings. However, the present invention is not limited to such a form. To be specific, it is enough for the turbine-wheel side end of the inner race to be located away from the turbine-side step, and the present invention can be realized by appropriately setting the dimension about the axial direction of the inner race of the turbine-side ball bearing and the location of the positioning portion within the limit of separation of this end from the turbine-side step. Additionally, the turbine-side and impeller-side ball bearings do not have to be positioned integrally. The present invention may be realized by positioning these by use of separate members.

In each embodiment described above, the gap is defined between the end of the inner race of the turbine-side ball bearing and the turbine-side step without interposing any member. However, the invention may be realized by filling the gap with a member that ensures a predetermined clearance or other member such as one that more easily deforms elastically than the materials composing the inner race and rotation shaft. The form in which such a member is inserted in the gap prevents direct contact of the inner race and the turbine-side step. Accordingly, the purpose of the present invention can be achieved without causing turbine-wheel side curving as a result of positioning of the turbine-side ball bearing.

The invention claimed is:

1. A bearing unit for a turbocharger supporting a rotary shaft having one end provided with a turbine wheel, the other end provided with an impeller, and a large-diameter turbine-side step formed on the turbine wheel side, the rotary shaft being supported between the turbine-side step and the impeller such that the rotary shaft is freely rotatable, the bearing unit comprises:
   a turbine-side ball bearing having an inner race adjacent to the turbine side-step and in which balls are located on the turbine-wheel side;
   an impeller-side ball bearing positioned such that balls are located on the impeller side; and
   a positioning portion configured to restrict movement of the inner race of the turbine-side ball bearing toward the turbine wheel side and to position the turbine-side ball bearing such that the turbine wheel side end of the inner race is separated from the turbine side step,
   wherein an impeller-side end of the inner race of the turbine-side ball bearing extends to a point close to the impeller, wherein movement of the impeller-side end of the inner race is restricted by the positioning portion.

2. The bearing system according to claim 1, wherein while movement of the inner race of the impeller-side ball bearing toward the turbine wheel side is restricted, the inner race of the impeller-side ball bearing is provided around an outer circumference of the inner race of the turbine-side ball bearing, wherein the positioning portion is located closer to the impeller than to the center of any of the balls of the impeller-side ball bearing.

3. The bearing unit according to claim 1, wherein the impeller-side ball bearing is positioned integrally with the turbine-side ball bearing by use of the positioning portion.

4. The bearing unit according to claim 3, further comprising a spacer interposed between the respective inner races of the impeller-side ball bearing and turbine-side ball bearing and having its width about the direction of an axis of the rotary shaft.

5. A bearing unit for a turbocharger supporting a rotary shaft having one end provided with a turbine wheel, the other end provided with an impeller, and a large-diameter turbine-side step formed on the turbine wheel side, the rotary shaft being supported between the turbine-side step and the impeller such that the rotary shaft is freely rotatable, the bearing unit comprises:
   a turbine-side ball bearing in which balls are located on the turbine-wheel side;
   an impeller-side ball bearing positioned such that balls are located on the impeller side; and
   a positioning portion configured to restrict movement of an inner race of the turbine-side ball bearing toward the turbine wheel side and to position the turbine-side ball bearing such that the turbine wheel side end of the inner race is separated from the turbine side step,
   wherein the inner race of the turbine-side ball bearing and the turbine-side step do not come into contact with each other directly, and
   wherein the inner race of the turbine-side ball bearing extends to a point close to the impeller, wherein movement of this impeller-side end of the inner race is restricted by the positioning portion.

6. The bearing system according to claim 5, wherein while movement of the inner race of the impeller-side ball bearing toward the turbine wheel side is restricted, the inner race of the impeller-side ball bearing is provided around an outer circumference of the inner race of the turbine-side ball bearing, wherein the positioning portion is located closer to the impeller than to the center of any of the balls of the impeller-side ball bearing.

7. The bearing unit according to claim 5, wherein the impeller-side ball bearing is positioned integrally with the turbine-side ball bearing by use of the positioning portion.

8. The bearing unit according to claim 7, further comprising a spacer interposed between the respective inner races of the impeller-side ball bearing and turbine-side ball bearing and having its width about the direction of an axis of the rotary shaft.

9. A bearing unit for a turbocharger supporting a rotary shaft having one end provided with a turbine wheel, the other end provided with an impeller, and a large-diameter turbine-side step formed on the turbine wheel side, the rotary shaft being supported between the turbine-side step and the impeller such that the rotary shaft is freely rotatable, the bearing unit comprises:
   a turbine-side ball bearing in which balls are located on the turbine-wheel side;
   an impeller-side ball bearing positioned such that balls are located on the impeller side; and
   a positioning portion configured to restrict movement of an inner race of the turbine-side ball bearing toward the turbine wheel side and to position the turbine-side ball bearing such that the turbine wheel side end of the inner race is separated from the turbine side step,
   wherein the inner race of the turbine-side ball bearing does not come into contact with the turbine-side step, and
   wherein an impeller-side end of the inner race of the turbine-side ball bearing extends to a point close to the impeller, wherein movement of the impeller-side end of the inner race is restricted by the positioning portion.

10. The bearing system according to claim 9, wherein while movement of the inner race of the impeller-side ball bearing toward the turbine wheel side is restricted, the inner race of the impeller-side ball bearing is provided around an outer circumference of the inner race of the turbine-side ball bearing, wherein the positioning portion is located closer to the impeller than to the center of any of the balls of the impeller-side ball bearing.

11. The bearing unit according to claim 9, wherein the impeller-side ball bearing is positioned integrally with the turbine-side ball bearing by use of the positioning portion.

12. The bearing unit according to claim 11, further comprising a spacer interposed between the respective inner races of the impeller-side ball bearing and turbine-side ball bearing and having its width about the direction of an axis of the rotary shaft.

13. A bearing unit for a turbocharger supporting a rotary shaft having one end provided with a turbine wheel, the other end provided with an impeller, and a large-diameter turbine-side step formed on the turbine wheel side, the rotary shaft being supported between the turbine-side step and the impeller such that the rotary shaft is freely rotatable, the bearing unit comprises:
   a turbine-side ball bearing having an inner race adjacent to the turbine side-step and in which balls are located on the turbine-wheel side;
   an impeller-side ball bearing positioned such that balls are located on the impeller side; and a positioning portion configured to restrict movement of the inner race of the turbine-side ball bearing toward the turbine wheel side and to position the turbine-side ball bearing such that the turbine wheel side end of the inner race is separated from the turbine side step, wherein the inner race of the turbine-side ball bearing has a projecting portion, which juts out toward the center of the rotation shaft, and wherein the positioning portion is provided in the form of a positioning step, wherein the positioning step is formed on the rotary shaft so as to increase in diameter toward the turbine wheel side and able to come into contact with the projecting portion.

14. A bearing unit for a turbocharger supporting a rotary shaft having one end provided with a turbine wheel, the other end provided with an impeller, and a large-diameter turbine-side step formed on the turbine wheel side, the rotary shaft being supported between the turbine-side step and the impeller such that the rotary shaft is freely rotatable, the bearing unit comprises:

a turbine-side ball bearing in which balls are located on the turbine-wheel side;

an impeller-side ball bearing positioned such that balls are located on the impeller side; and a positioning portion configured to restrict movement of an inner race of the turbine-side ball bearing toward the turbine wheel side and to position the turbine-side ball bearing such that the turbine wheel side end of the inner race is separated from the turbine side step, wherein the inner race of the turbine-side ball bearing and the turbine-side step do not come into contact with each other directly, and wherein the inner race of the turbine-side ball bearing has a projecting portion, which juts out toward the center of the rotation shaft, and wherein the positioning portion is provided in the form of a positioning step, wherein the positioning step is formed on the rotary shaft so as to increase in diameter toward the turbine wheel side and able to come into contact with the projecting portion.

15. A bearing unit for a turbocharger supporting a rotary shaft having one end provided with a turbine wheel, the other end provided with an impeller, and a large-diameter turbine-side step formed on the turbine wheel side, the rotary shaft being supported between the turbine-side step and the impeller such that the rotary shaft is freely rotatable, the bearing unit comprises:

a turbine-side ball bearing in which balls are located on the turbine-wheel side;

an impeller-side ball bearing positioned such that balls are located on the impeller side; and a positioning portion configured to restrict movement of an inner race of the turbine-side ball bearing toward the turbine wheel side and to position the turbine-side ball bearing such that the turbine wheel side end of the inner race is separated from the turbine side step, wherein the inner race of the turbine-side ball bearing does not come into contact with the turbine-side step, and wherein the inner race of the turbine-side ball bearing has a projecting portion, which juts out toward the center of the rotation shaft, and wherein the positioning portion is provided in the form of a positioning step, wherein the positioning step is formed on the rotary shaft so as to increase in diameter toward the turbine wheel side and able to come into contact with the projecting portion.

* * * * *